April 7, 1970  J. KOSTALOS, JR  3,505,506
KVAH COMPUTER FOR OBTAINING THE SQUARE ROOT
OF THE SUM OF TWO QUANTITIES
Filed Oct. 22, 1965  4 Sheets-Sheet 1

WITNESSES:
Bernard R. Giegueg
James F. Young

INVENTOR
John Kostalos, Jr.
BY C.L. Freedman
ATTORNEY

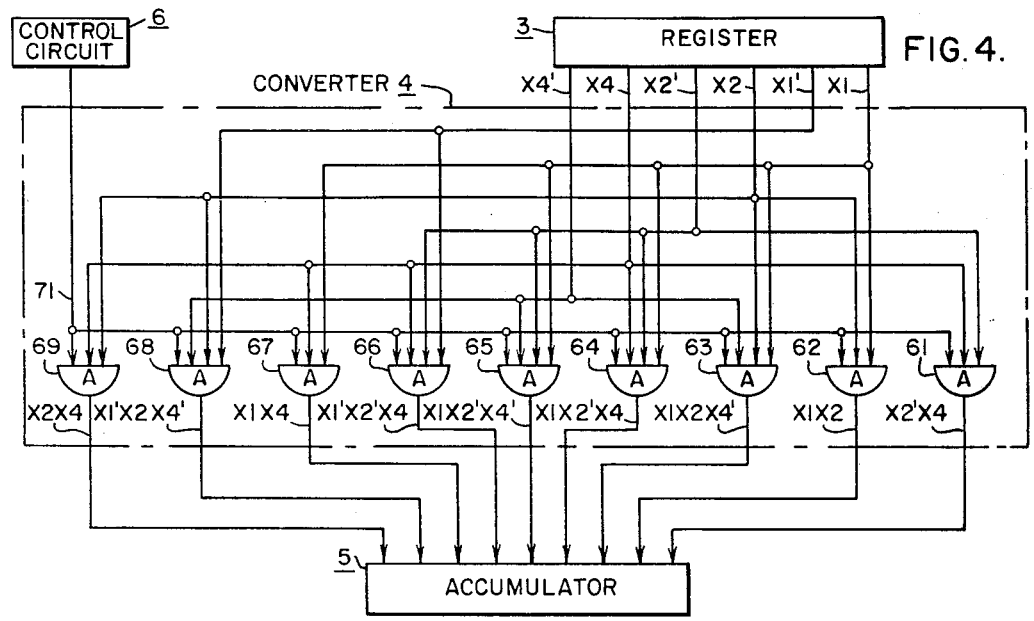
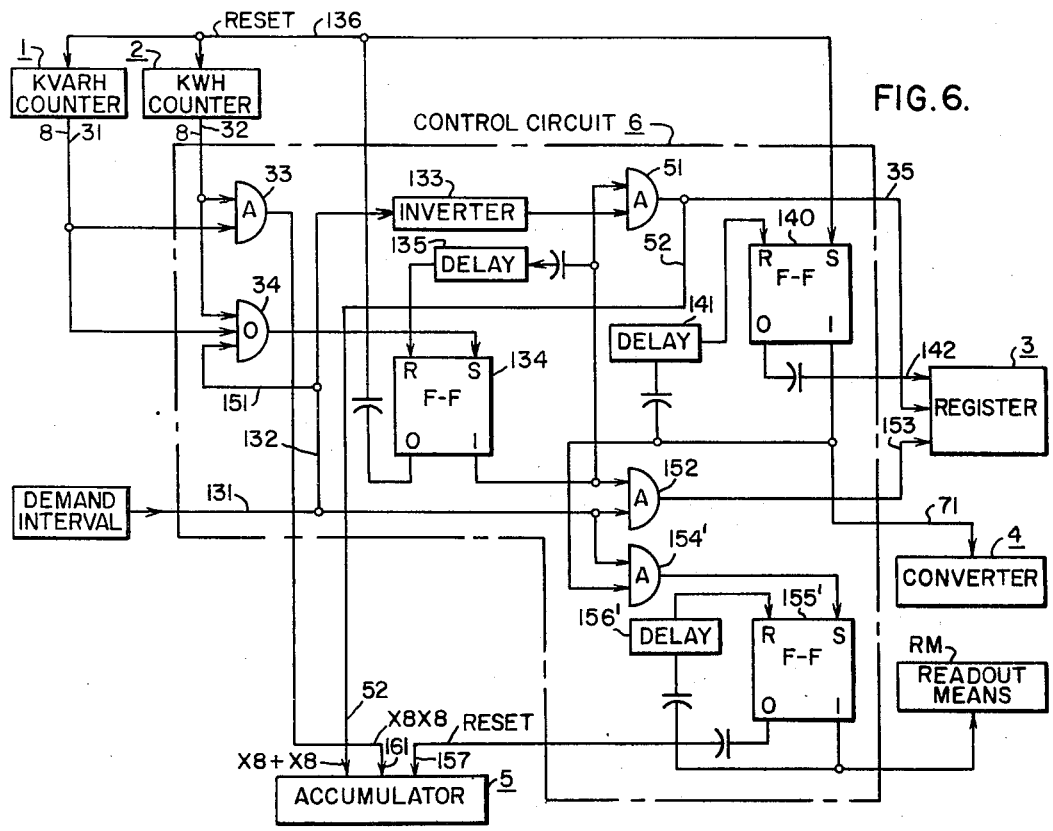

United States Patent Office 3,505,506
Patented Apr. 7, 1970

3,505,506
KVAH COMPUTER FOR OBTAINING THE SQUARE ROOT OF THE SUM OF TWO QUANTITIES
John Kostalos, Jr., Pittsburgh, Pa., assignor to Westinghouse Electric Corporation, Pittsburgh, Pa., a corporation of Pennsylvania
Filed Oct. 22, 1965, Ser. No. 502,219
Int. Cl. G06f 15/20, 7/38; G01r 7/00
U.S. Cl. 235—151.31
18 Claims

ABSTRACT OF THE DISCLOSURE

In order to measure voltampere hours, pulses W representing watthours, and pulses R representing varhours are generated and supplied to separate counters. Each time the count in one of the counters reaches a predetermined value (e.g. $W=8$), the contents N of the other counter is transferred to a register and both counters are reset. An amount 8 is added to an accumulator, and an amount $\sqrt{8^2+N^2}-8$ is added to the lower order bits of the accumulator as determined by a converter. The register is then reset preparatory to another measuring cycle during a demand interval. Thus if $N=3$, $\sqrt{8^2+N^2}=8.544$. The value 8 is added directly and the remainder .544 is obtained by adding the fractions $\frac{1}{2}+\frac{1}{32}+\frac{1}{128}+\frac{1}{256}$ through the converter.

---

This invention relates to electrical measuring instruments and in particular to instruments for determining the kilovolt-amperes flow in an electrical circuit.

As is well known in the electrical industry, the current which electrical public utilities may be called upon to supply to a customer may be considered to comprise two components, a wattage component in phase with the line voltage, and a wattless, or reactive, component in quadrature therewith. When a wattage meter measures the input at the customer's premises, the wattage component alone is registered, and the reactive component, no matter how large, is not accounted for. This is usually not a serious omission in the case of the ordinary household customer, but, in the case of large customers leaving the reactive current out of the account would place a heavy burden on the utility, since both watt and wattless components play a part in determining the size and expense of electric generators and other elements in the utility's system. Hence most utilities now install at many points on their systems, for example the premises of a large customer in addition to kilowatthour (i.e. KWH) meters which account for wattage current, other meters called reactive kilovolt ampere hour (i.e. KVARH) meters which account for reactive current. It was found possible to make the latter meter by a rather simple alteration of the structure of the KWH meter.

The relative magnitudes of the wattage and reactive current components, even at a particular customer's premises, are likely to vary from time to time, but a utility's purposes are sufficiently satisfied usually if it learns the amount of KWH input to a customer over time durations like a quarter or half hour, and the same is true of KVARH input. Hence many utilities provide the KVARH meters, and their companion KWH meters, with rather simple arrangements which transmit a brief current pulse to a central office at completion of each rotation of the rotors of these meters. Pulse signals thus arrive at the central office at intervals, each pulse indicating a definite number of KWH or KVARH for a particular customer.

It is often desirable on certain accounts to know the value of the total volt-ampere flow during a given period, i.e. the resultant of the watt and reactive components flow for a customer during such period; and this is obtainable closely enough, as $KVAH = \sqrt{KWH^2 + KVARH^2}$ from the above-described pulse readings during that period. The present invention is an electronic arrangement which can automatically register and display this result; i.e. register KVAH. In certain claims herein one of the above pulse readings is called A and the other B.

The relative values of KWH and KVARH may, in the general case, be anything, though in the usual practical case KWH will be greater; and the case where the two will be equal will be decidedly exceptional. In the present invention the times when KVAH will be read will usually be those at which the larger of these two quantities reaches a certain value; but provision is made that if, after a predetermined time fixed by a clock outside the system, neither KWH or KVARH has reached the aforesaid certain value, the value KVAH will be registered.

While this invention may be applied to cases where the above-mentioned "certain value" is of any magnitude, it will herein be illustrated for the value of 8 pulses for A; i.e. for the binary number 1000 for A.

One object of this invention is to receive accordingly separate electric pulses respectively indicative of the KWH and the KVARH passing a point in a power system during a time period and to register the KVAH resultant therefrom.

Another object is to receive separate electric signals respectively indicative of the power and the reactive power passing a point in an electric circuit and to register a quantity proportional to the product of potential, current and time corresponding thereto.

Another object is to receive separate electric signals respectively proportional to the wattage-current and the wattless current passing a point in an electric circuit and to register a quantity proportional to the total current corresponding thereto.

Still another object is to receive separate electric signals respectively indicative of the wattage current and the wattless current passing a point in an electric network during a predetermined time and to record a quantity indicative of the total current corresponding thereto.

Still another object is to receive separate electric signals respectively indicative of two quantities and to record a quantity indicative of the value of the square root of the sum of the squares of said quantities.

Yet another object is to register a quantity proportional to the square root of the sum of the squares of two varying quantities when one of said varying quantities reaches a predetermined value.

Still another object is to record, at the end of a predetermined time, a quantity equal to the square root of the sum of the squares of two quantities, at least one of which has been varying during that time.

Another object is to provide apparatus which registers the square root of the sum of the square of two binary-notation quantities.

Other objects of this invention may be evident upon reading the following description and claims for the attached drawings in which:

FIGURE 1 is a schematic block diagram for the assemblage of the electric circuits shown in the other drawings;

FIG. 2 is a more detailed schematic of the internal makeup of the two counters of FIG. 1. A number of different counter circuits are known in the computer art; one form operative for the rectangles of this figure is shown and described, for example, on pages 77 to 80 of Ronald M. Benrey's book, "Understanding Digital Computers," J. F. Rider, publisher, New York city, 1964;

For the reader's convenience, FIG. 2A is a schematic diagram of a bistable circuit from Benrey's page 78;

FIG. 3 is a corresponding schematic of the internal makeup of a suitable register for FIG. 1 showing logic "OR" gates labeled "O" and logic "AND" gates labeled "A," and bistable circuits in the lowest group of rectangles. Each of these components is known and used in the computer art; suitable "OR" gate and "AND" gate details are described in FIGS. 5–6 to 5–9, pages 69 to 72 of the above Benrey book, and suitable bistable elements at pages 77 to 79 thereof;

FIG. 4 is a similar view showing internal make up of the converter 4 of FIG. 1;

FIG. 6 is a schematic of the control-net 6 of FIG. 1 in greater detail.

Figure 1:
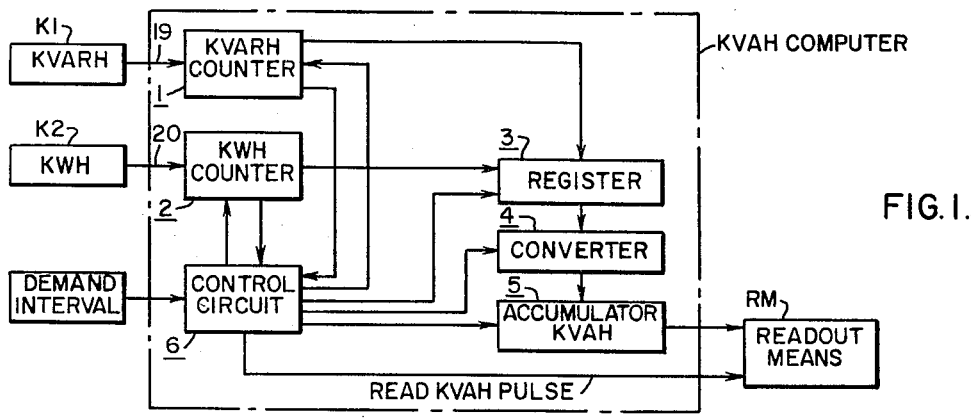

Referring to detail in FIG. 1, electric pulses, preferably of the order of a few millionths of a second in length transmitted from a reactive kilovoltampere hour (KVARH) meter K1 of conventional type located at some point such as a customer's premises, will be received by a pulse-counter 1 and similar pulses transmitted from the same point and transmitted from a kilowatt hour (KWH) meter K2 will be received by a second pulse counter 2. Although the pulses may be supplied directly by impulse meters to the counters, the pulses initially may be recorded on a suitable medium such as magnetic tape. The recorded pulses subsequently would be reproduced and supplied to the counters. These counters, which may be of the binary number form, are shown and described in greater detail in FIG. 2. The outputs of counters 1 and 2 are fed, through proper gating shown in detail in FIG. 3, to a register 3 and thence through a converter 4 to an accumulator 5, register 3 and converter 4 being shown and described in detail in FIGS. 3 and 4, while accumulator 5 is similarly detailed in FIG. 5. The actions of all the foregoing components are controlled by suitable electric pulses from a control-net 6 shown in detail in FIG. 6.

Figure 2:
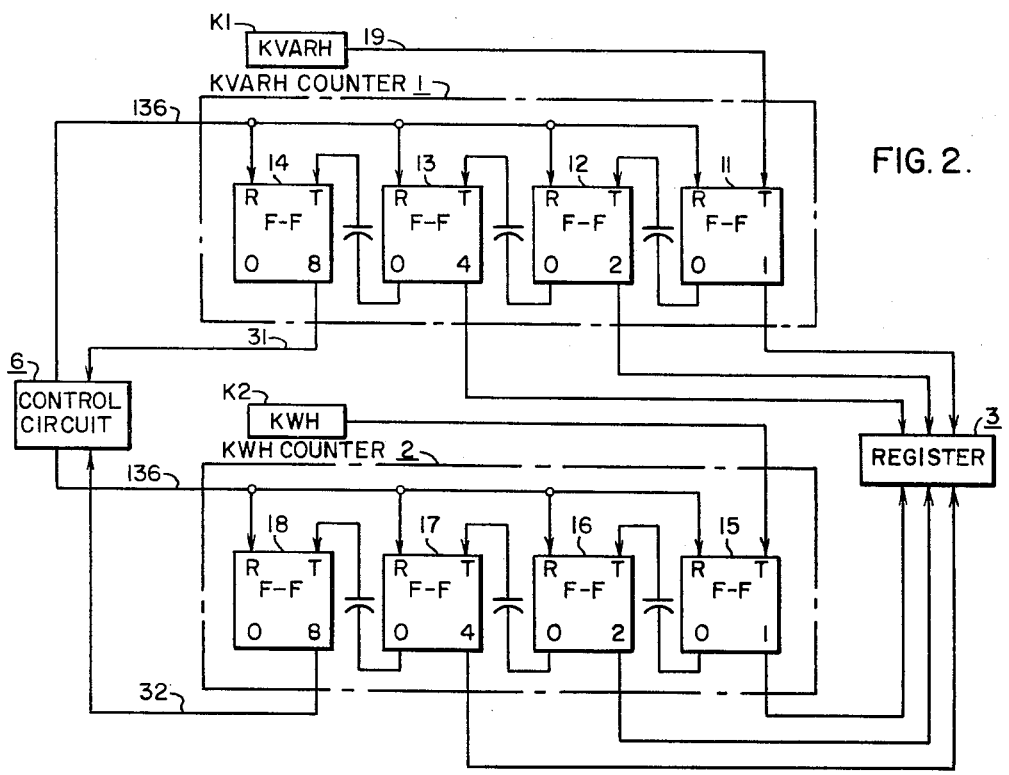
Figure 2A:
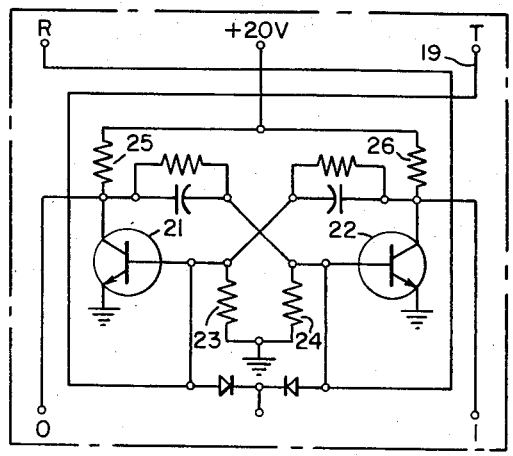

Turning in detail to FIGS. 2 and 2A, each of the counters 1 and 2 may comprise four similar flip-flop or bistable electronic circuits or elements 11, 12, 13, 14 and 15, 16, 17, 18, all as shown in more detail in FIG. 2A, comprising a pair of transistors 21, 22 having their emitter electrodes grounded. Their base electrodes are likewise grounded through resistors 23, 24 and their collector electrodes are connected to a positive terminal of a direct-current source through resistors 25, 26 respectively. The collector electrode of transistor 21 is connected to the base electrode of transistor 22 by a resistor shunted by a capacitor, and a similar resistor-capacitor combine connects the collector of transistor 22 to the base electrode of transistor 21. As is well known in the electronics art, such a network is one form of bistable element, one in which one terminal, e.g. the collector of transistor 21, once set more positive in potential than the collector electrode of transistor 22, will remain so until a more positive voltage pulse is injected onto the base electrode of transistor 22; thereupon the collector electrode of transistor 22 becomes the more positive of the two collector electrodes, and will so remain unless and until a positive pulse is applied to the base of transistor 21. The network is thus a bistable circuit, flip-flopping from one of the above-described states to the other. The base electrodes may be interconnected through a pair of oppositely-poled rectifying diodes to provide a complement input, but such an input is not here required.

The terminals marked 0 in FIGS. 2 and 2A are each connected through a capacitor and an input lead marked T to the base electrode of the transistor 21 of the adjacent flip-flop of higher reference numeral in FIG. 2, and a reset lead marked R is connected to the base electrode of transistor 22. When any bistable circuit has a positive voltage on its transistor 22 collector, the incoming of a pulse on its R inlead will flip it and make its transistor 21 collector positive.

In FIG. 2 the existence of a positive voltage on the left-hand collector electrode (i.e. on collector of transistor 21) of each of the flip-flops 11 through 18 may be taken to indicate a 0 bit in a binary number, flip-flops 11 and 15 representing the number $2^0$ in a pair of such numbers, flip-flops 12 and 16 representing the number $2^1$ in such pair, flip-flops 13 and 17 representing $2^2$, while flip-flops 14 and 18 represent $2^3$. Thus, at commencement of a counting period of time, the fact that no pulse had been received from either the KVARH transmitter K1 nor the KWH transmitter K2 would be indicated by positive potential on the left-hand terminal and zero potential on the right-hand terminal of each bistable element 11 through 18. Thus each counter would indicate the binary 0000. Arrival of a first pulse from the KVARH transmitter K1 over the input line 19 (FIG. 2) would make the right-hand terminal of bistable element 11 positive, the other bistable circuits 12 through 18 remaining unchanged. Counter 1 would then indicate the binary number 0001, and counter 2 would still indicate the binary number 0000. Arrival of a second pulse from the KVARH transmitter K1 would flip the left-hand terminal of bistable element 11 back to positive and this would result in the right-hand terminal of bistable element 12 becoming positive. Thus the counter 1 would indicate the binary number 0010; i.e. would indicate 2 KVARH pulses received.

Reception of a third KVARH pulse would flip the bistable 11 so that its right-hand terminal would become positive and counter 1 would indicate the binary number 0011; i.e. the receipt of three KVARH pulses.

Counter 2 would continue to indicate the binary number 0000 until an electric pulse was transmitted to it over input line 20 from the KWH meter K2 at the customer's premises. Then it would indicate the binary numbers of KWH pulses received in the manner just described for counter 1. In short, a reading other than zero on any bistable element 11 to 18 means a positive voltage on its output terminal.

Figure 3:
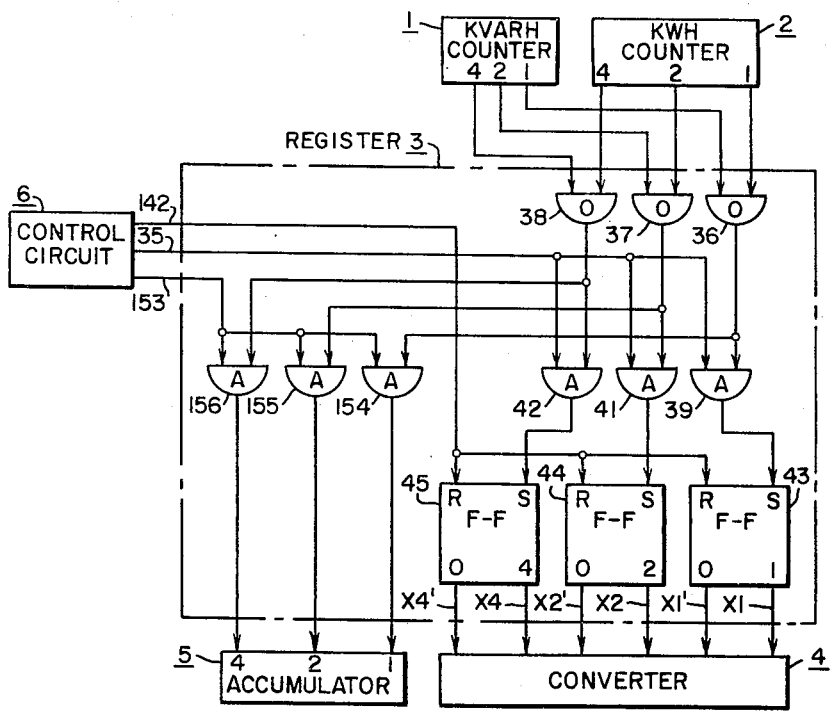
FIGS. 3A and 3B are for present reader's convenience, copies of Benrey's FIGS. 5–6 and 5–7.

The outputs of the bistable circuits 11, 12, 13 and of 15, 16, 17 are connected, pair by pair, in FIG. 3 to the two inputs of "OR" gates 36, 37, 38 which are open to pass their outputs to "AND" gates 39, 41, 42.

Figure 3A:
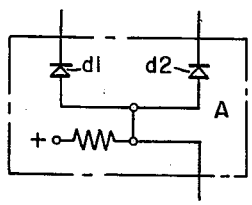
Figure 3B:
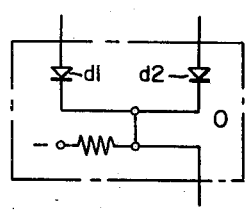
Figure 5:
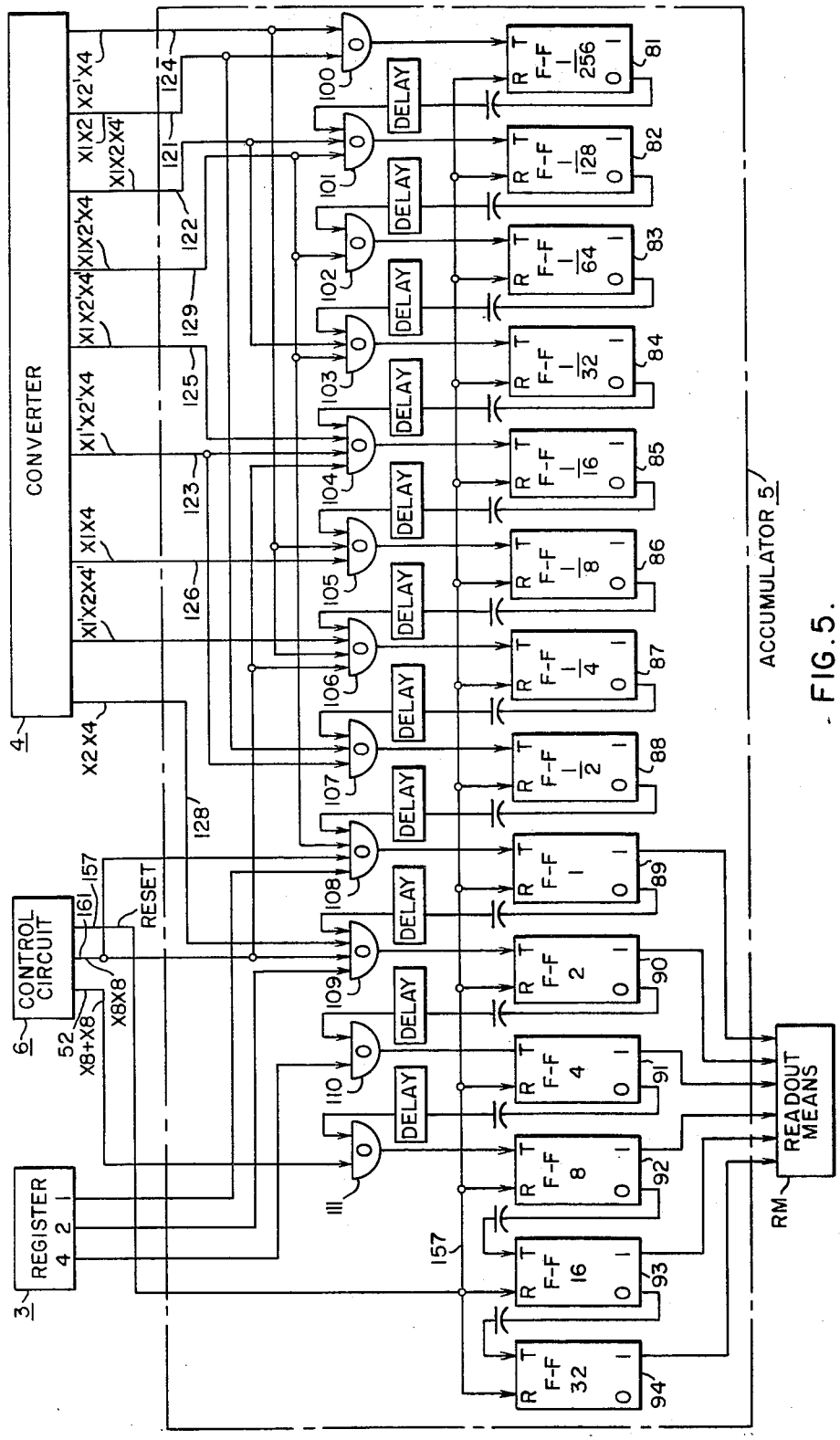
FIG. 5 is a similar view showing internal make up of the accumulator 5 of FIG. 1.

While a number of different types of "AND" gates and "OR" gates are known in today's art, types suitable for use here, and derived from FIGS. 5–6 and 5–7 of Benrey, appear in FIGS. 3A and 3B. In each, two diodes, d1 and d2, are connected to the input leads, while their opposite poles are joined to the common terminal of a resistor and the output lead. In the "AND" gate A (FIG. 3A), however, it is the cathodes of the diodes which are connected to the input leads, and the positive terminal of a direct voltage source is connected to the outboard end of the resistor, while in the "OR" gate O (FIG. 3B) the polarities of both the diodes and the voltage source are just the reverse of these. The "AND" gate is open to pass current only when positive voltage is present on both input leads, while positive voltage on either input lead passes through an "OR" gate.

The counters 1 and 2 would continue in the foregoing manner until the eighth pulse reached one or the other of them. Examination of FIGS. 2 and 6 will show that two leads, 31 and 32, connect the "8" terminals of bistable elements 14 and 18 to the inputs of "AND" gate 33 and "OR" gate 34 in the control-net (FIG. 6). The control-net, as will be more fully described later, will then send a pulse over an output lead 35 causing "AND" gates 39, 41, 42 of FIG. 3 to open and discharge those bistable circuit elements of counters 1 and 2 which have voltages other than 0, into the bistable circuits 43, 44, 45 of the register 3.

It may be noted that when one of the bistable elements 11 to 18 of FIG. 2 indicates an 0, its right-hand in (FIG.

2) output terminal stands at zero voltage; when it flips to indicate binary 1, its right-hand output terminal becomes positive. When one of the two counters 1 and 2 reacts to register 8 (i.e. binary number 1000) its three bistable circuits indicative of digits 1 through 7, will have turned to 0, and its output terminal voltages will correspondingly stand at 0. On the other hand some of the three output terminals of the bistable circuits of the other counter, since the latter indicates a number less than 8 (i.e. a binary less than 1000) will stand at voltages other than 0. The above-described opening of "AND" gates 39, 41, 42 will accordingly result in transferring to the bistable elements of the register 3 a replica of the binary number registered on the bistable circuits of the lower reading one of the counters of FIG. 2.

The register 3 thus exhibits a replica of the binary number registered by the lesser of the counters 1 and 2; i.e. a binary number showing the number of the smaller of the two readings of the KWH meter K2 and KVARH meter K1 at the customer's premises. The decimal value of this number must be an integer smaller than 8; i.e. either 0, 1, 2, 3, 4, 5, 6 or 7. In other words this number is that previously designated B in the initial discussion above.

To make the output of our accumulator register $\overline{KVAH}$ we must make it register a binary number equal to $\sqrt{8^2+B^2}$ where B is one of the integers 0 to 7. If B is 0, our control-net need only register 8 in the accumulator. This case will now be considered. When either counter 1 or 2 registers an 8, lead 31 and 32 sends through first control-net "OR" gate 34 in FIG. 6 a pulse which causes the terminal marked 1 in a first control-net bistable element 134 (a flip-flop like FIG. 2A) to emit a positive pulse to a first control-net "AND" gate 51 of FIG. 6. The output of "AND" gate 51 transmits a pulse over lead 52 and through "OR" gate 111 of FIG. 5 to add a 1 to the registration of the bistable circuit 92 which indicates 8, i.e. indicates binary number 1000 in the accumulator 5.

Since register 3 will show 0000 for the binary value of B, nothing but zeros can pass through converter 4 to accumulator 5 and the reading of the latter will be augmented only by binary number 1000, the proper value for $\sqrt{8^2+0^2}$, in the case where B is 0.

Where B is any one of the decimal integers 1 to 7 the values, in addition to the binary 1000 just described, which must be added to the accumulator to get KVAH will be $\sqrt{8^2+B^2}-8$. These have been calculated and appear as decimal numbers in the following table. They should appear on the accumulator 5 approximated as binary numbers as negative powers of 2 down to $2^{-8}$, and such binary approximations appear also in the table.

| B | B as a binary | $\sqrt{8^2+B^2}-8$ | Binary No. |
|---|---|---|---|
| 1 | 001 | 0.062 | 0.00010000 |
| 2 | 010 | 0.246 | 0.01000000 |
| 3 | 011 | 0.544 | 0.10001011 |
| 4 | 100 | 0.944 | 0.11110010 |
| 5 | 101 | 1.434 | 1.01101111 |
| 6 | 110 | 2.000 | 10.00000000 |
| 7 | 111 | 2.630 | 10.10100001 |

Since the register 3 contains the binary number corresponding to B it may be employed by a proper converter 4 to cause binary numbers, approximating in any desired degree the value of $\sqrt{A^2+B^2}-A$, to be inserted in the accumulator.

Like FIG. 2, each bistable circuit or element, 43, 44, 45 in FIG. 3 has an output terminal marked 0 which bears a positive voltage when the bistable element registers a 0 bit in a binary number, and a second output terminal which is positive when the bistable element registers a bit in a binary number corresponding to the decimal number marked on its other output terminal. Thus the bistable element 45 has a positive voltage on its terminal marked 4 when it registers a binary 100, and a zero voltage at all other times. A set of bus bar pairs is provided in converter FIG. 4, one for each bistable element in the register of FIG. 3, and marked X1 and X1' for the respective 1 and 0 terminals of bistable element 43, X2 and X2' for the respective 2 and 0 terminals of bistable element 44, and X4 and X4' for the respective terminals of bistable element 45, to which they are connected. Any binary number in the register 3 will be represented by a unique group of these bus bars, each bearing a positive voltage. Thus a binary number 011 would be represented by bus bars X4', X2, X1. By selecting the bus bar combination representing whatever binary number may be standing in the register 3 after the control-circuit 6 has discharged the counter 1 or 2 (whichever is the lesser) into it, voltage pulses are made available to register 1 bits in any group of bistable elements in the accumulator 5 that may be desired. Thus, if a bistable element is provided in the accumulator for each power of 2, plus or minus, which is needed to express as a binary number, the desired approximations to $\sqrt{A^2+B^2}-A$, "AND" gates may be used to discharge any selected group of FIG. 4 bus bars into the group of accumulator bistable elements which properly expresses the value of $\sqrt{A^2+B^2}-A$. When $A=8$, as in this example, the binary numbers which are to be augmented by these discharges is given in the foregoing table.

FIG. 4 shows converter "AND" gates 61 through 69 which pass the discharges from the proper groups of bus bars through their output circuits to selected groups of accumulator bistable elements and "OR" gates in FIG. 5 when the control circuit of FIG. 6 energizes them by sending a pulse over output lead 71.

The constant reigstered in the accumulator 5 will thus have been augmented by $A=$binary 1000 (=decimal 8) plus $\sqrt{A^2+B^2}-A$, (i.e. $\sqrt{8^2+B^2}-8$ in this example) for any one of the possible values of B. In short the accumulator reading will be augmented by $\sqrt{A^2+B^2}$ (i.e. $\sqrt{8^2+B^2}$ here) and will be augmented by a number equal to the KVAH.

The accumulator 5 comprises bistable elements 81 through 92 having inputs connected through "OR" gates 101 through 111 to the outputs of various groups of the converter "AND" gates 61 through 69 of FIG. 4 in the way about to be described. The terminal marked 0 in each bistable element as in FIG. 2A is connected through a capacitor and an input of its associated "OR" gate with the T input of the next bistable circuit. In addition, higher-numbered bistable elements of any desired number, here represented by 93 and 94, are connected as in FIG. 2 to continue the accumulator bistable claim to any desired higher number. Applying the above principles to the present circuits for an exemplary case where 3 pulses have been received from the KVARH meter K1 at the time the 8th pulse arrives from the KWH meter K2, so $B=3$, the foregoing table showing B's binary value to be 011; hence bus bars X1, X2, X4' would be positive. The table further shows the value KVAH$-8=0.544$ for this value of B to be approximately the binary 0.10001011; i.e. by $2^{-1}+2^{-5}+2^{-7}+2^{-8}$, i.e. in decimal notation by $\frac{1}{2}+\frac{1}{32}+\frac{1}{128}+\frac{1}{256}$.

Reference to FIG. 5 will show that buses X1 and X2 are connected by lead 121 to send + pulses from output of converter "AND" gate 62 in FIG. 4 through "OR" gates 100 and 107 to activate the bistable elements 81 and 88, thus registering $\frac{1}{256}$ and $\frac{1}{2}$ of the foregoing group, and lead X1, X2, X4' connects from converter "AND" gate 63's output, through lead 122 and "OR" gates 101 and 103 to actuate bistable elements 82 and 84, thus registering $\frac{1}{128}$ and $\frac{1}{32}$ of the foregoing group, Thus with the 8 previously registered on bistable element 92 when that number of pulses was first received, the accumulator 5 registers the value 8.544 (i.e. binary 1000.10001011) the value of KVAH for $A=8$ and $B=3$.

In similarwise lead 123 connects the output of "AND" gate 66 through "OR" gates 104 and 107 to actuate bistable elements 85 and 88; lead 124 connects the output of "AND" gate 61 through "OR" gates 100 and 106 to actuate bistable elements 81 and 87; lead 125 connects output of "AND" gate 65 through "OR" gate 104 to actuate bistable element 85; lead 126 connects the output of "AND" gate 67 through "OR" gate 105 to actuate bistable element 86; lead 127 connects the output of "AND" gate 68 through "OR" gate 106 to actuate bistable element 87; lead 128 connects the output of "AND" gate 69 through "OR" gate 109 to actuate bistable element 90; and lead 129 connects the output of "AND" gate 64 through "OR" gates 101, 102, 103 and 108 to actuate bistable elements 82, 83, 84 and 89. These interconnections are sufficient to cause the accumulator to register the proper value of KVAH for any value of pulse input B from 1 through 7.

The control circuit 6 which controls the "AND" gates and so determines the timing of the actuations just described will now be explained. As stated at the outset, it is usually desired by the user to have the KVAH read periodically, and a demand interval pulse is injected over the inlead 131 of FIG. 6 for this purpose. The description so far covers the situation where either the eighth KVARH pulse or the eighth KWH pulse is received before this demand interval is over. Lead 132 passes from lead 131 through an inverter 133 to one input of the first control-net "AND" gate 51 in FIG. 6. Inverters are elements having a voltage inversion between input and output and are well known in the art; a suitable type appears in FIGS. 5–4 of Benrey. The presence of inverter 133 means that when no voltage pulse is present during the demand interval on inlead 131 the "AND" gate 51 passes any pulse coming through first control-net bistable element 134 of FIG. 6; but that "AND" gate 51 of FIG. 6 will be blocked against further pulse passage while the demand interval pulse is present on inlead 131.

As previously stated the first time at which one of the counters 1 or 2 reads the eighth pulse arriving from the KVARH or the KWH meter, it sends a pulse over line 31 or line 32 through "OR" gate 34 and this acts to make positive the terminal marked S on bistable element 134. This pulse passes through the first "AND" gate 51, (the latter being then clear because inverter 133 is normally holding it so) and passes over lead 35 which causes "AND" gates 39, 41, 42 to pass the reading of the lesser of the two counters 1 and 2 into register 3, whence it is at once distributed through converter 4 to the "AND" gates 61 through 69 of FIG. 4. Output lead 52 of "AND" gate 51 simultaneously sends a pulse through "OR" gate 111 to register the 8 of counter 1 or 2 on bistable element 92 in the accumulator FIG. 5.

Bistable element 134, like all other bistable elements in FIG. 5 has its output terminal 1 connected to its reset terminal marked R through a capacitor in series with a delay element 135. This causes the bistable element to reset with a + voltage on its terminal marked 0 after a predetermined delay time fixed by delay-element 135. The 0-terminal of first control-net bistable element 134 is connected through a capacitor to reset leads 136 which reset the counters 1 and 2 to their zero positions after the delay time imposed by delay unit 135. They are now in condition to accept new pulses from KVARH and KWH. The leads 136 are connected to the input terminal marked S of the second control-net bistable element 140 in FIG. 6. The terminal 1 thereof is connected through a lead 71 to transfer a discharge pulse to the "AND" gates of FIG. 4 to send into the accumulator 5 the content of those among them which have been unblocked by the + group of buses corresponding to the content of register 3 (as has already been described in discussing FIGS. 3, 4 and 5).

The output terminal marked 1 in bistable element 140 is also connected to its terminal R through a capacitor and delay element 141, and its 0 terminal, after the corresponding delay-time sends a pulse through lead 142 to reset the bistable elements 43, 44, 45 of register 3 to their zero content condition.

The portions of control circuit FIG. 6 described up to this point act to perform the following functions when no demand interval pulse is present on lead 131 and one of the two counters 1 and 2 has received an eighth pulse: (1) Transfer the count in the lesser of those counters to register 3; (2) add 8 from the greater of those counters to accumulator 5; (3) reset counters 1 and 2 to the zero (i.e. empty) values; (4) add KVAH–8 from converter 4 to accumulator 5; (5) reset register 3 to its zero condition.

When the end of a demand time interval is marked by a pulse on inlead 131, passage thereof to inverter 133 blocks first control-net "AND" gate 51 to prevent any pulse transfer over lead 35 from permitting any further transfer of contents from the counters 1 and 2 to register 3. By lead 151 a pulse passes through first control-net "OR" gate 34 to make positive the output terminal marked 1 of first control-net bistable element 134. This cooperates with the pulse on inlead 131 to render a third control-net "AND" gate 152 of FIG. 6 pervious to send a pulse over output lead 153 to "AND" gates 154', 155' and 156' of FIG. 3 to discharge any content then standing in counters 1 and 2 ahead of "AND" gates 39, 41, 42 into accumulator 5.

The positive voltage arising on the lead 136 (after the delay due to delay element 135) will cause bistable element 140 to send a pulse cooperating with the demand interval pulse on inlead 131 to send a pulse through a second control-net "AND" gate 154' of FIG. 6 to produce a pulse on its output terminal which is available to operate through a third control-net bistable 155' suitable readout means RM to read and record the contents registered on the accumulator 5. After a slight delay imposed by delay-element 156' lead 157 (FIG. 5 and FIG. 6) connected to bistable 155' terminal marked 0 will carry a pulse to return the bistable elements of the accumulator 5 to their zero condition ready for the next demand interval.

When the demand interval pulse arrived the following functions were accordingly carried out: (1) Transfer 1, 2 and 4 bits from both counters 1 and 2 to accumulator 5; (2) reset the counters; (3) add zeros from register 3 through converter 4 to accumulator 5 (needless to computation but added expense to avoid it); (4) reset register 3; transmit "read" signal to output equipment; reset accumulator 5.

There is a faint possibility that the counters 1 and 2 might receive their eighth pulses simultaneously though, by reason of the microsecond speed with which computer circuits complete their operations, this would be a very rare occurrence. To take care of this situation the leads 31 and 32 in FIG. 6 are connected into fourth control-net "AND" gate 33 which, in such a situation, will send a pulse over lead 161 (FIGS. 5 and 6) through "OR" gates 109, 108, 106 and 104 to bistables elements 90, 89, 87 and 85 of converter 5. With 8 pulses registered simultaneously for $\overline{KVARH}$ and $\overline{KWH}$ the value of $KVAH = \sqrt{KVARH^2 + KWH^2}$ is $\sqrt{8^2 + 8^2} = \sqrt{128} = 11.28$. The excess over the 8 (otherwise registered in accumulator 5) which must be added to that register is decimal number 3.314; i.e. binary 11.01010000. Lead 161 is connected via the "OR" gates last listed to augment accumulator 5 by this binary.

Inasmuch as the system computes KVAH from discrete pulses it is subject to certain errors. If it is assumed that a maximum of 3000 KWH pulses and 3000 KVARH pulses can be supplied in one demand interval, and that a computation block of 8 KWH pulses and 8 KVARH pulses is adopted in the manner discussed above, it can be shown that the maximum error does not exceed 0.3% of full scale. This is well within the acceptable tolerance.

I claim as my invention:

1. An electrical network comprising a first and a second pulse counter respectively adapted to store electric pulses in binary number form, an accumulator, and means connected to both said counters and arranged to cause the registering on said accumulator of a binary number equal to a predetermined value A when the content of the higher of said counters equals A and also adding to said accumulator when the content of the higher of said counters equals A a second binary number equal to $\sqrt{A^2+B^2}-A$, where B is the number registered on the other of said counters.

2. The arrangement described in claim 1 wherein said means includes a binary number register connected in common to the outputs of said counters and containing a plurality of bistable elements each having a pair of terminals on which complementary signals appear and each respectively registering at their opposite terminals both the 1's and 0's of the digits present in the binary numbers below A in said counters.

3. The arrangement specified in claim 2 wherein said means also includes group-responsive means for combining the outputs from said bistable elements into groups determined at any time by the content of said register.

4. The arrangement specified in claim 3 wherein said group-responsive means include electrical "AND" gates, each of said "AND" gates being responsive to presence of the outputs in a separate one of the groups for producing a separate individual output.

5. The arrangement specified in claim 3 wherein for each value of B, said group-responsive means select for delivery to said accumulator energizing signals which actuate said accumulator to register a binary number approximately $\sqrt{A^2+B^2}-A$.

6. The arrangements specified in claim 5 wherein A is the number 8 and B is an integer less than 8, and said group-responsive means includes "AND" gates which are opened to combine outputs from the bistable element terminals into the following groups X1, X2; X1, X4; X2, X4; X2', X4; X1, X2, X4'; X1, X2', X4'; X1', X2, X4', X1', X2', X4; X1, X2', X4 where the opposite terminals also of the three bistable elements forming the register are respectively X1 and X1', X2 and X2', and X4 and X4'.

7. The arrangement specified in claim 6 wherein "OR" gates are energized by said groups, and wherein accumulator sections respectively indicating the integer bits of a binary number are energized through said "AND" gates and "OR" gates serially connected to pass current from the terminal groups listed in claim 6 to the accumulator sections each of which registers one of the binary numbers tabulated below when the terminals in any group to the right of the selected binary number all have outputs:

| Binary number | Groups connected to pass |
| --- | --- |
| 0.00000001 | X1, X2; X2', X4 |
| 0.00000010 | X1, X2, X4'; X1, X2', X4 |
| 0.00000100 | X1, X2', X4 |
| 0.00001000 | X1, X2, X4'; X1, X2', X4 |
| 0.00010000 | X1, X2', X4'; X1', X2', X4 |
| 0.00100000 | X1, X4; X2', X4 |
| 0.01000000 | X2', X4; X1', X2, X4' |
| 0.10000000 | X1, X2; X1', X2', X4 |
| 1.00000000 | X1, X2', X4 |
| 10.00000000 | X2, X4 |

8. The arrangement specified in claim 5 wherein said means includes a control-net and both terminals indicating 8 in said counters are connected in said control-net through a first "OR" gate to a terminal of a first control-net bistable element having a first control-net output terminal connected to means to reset both said counters and a second output terminal connected to one input of a first control-net "AND" gate having a "pulse output" connected to energize the section of said accumulator which indicates 8.

9. The arrangement specified in claim 8 wherein "AND" gates are provided between said counters and the input to said register and the "pulse output" recited in claim 8 is connected to open the last-mentioned "AND" gates to discharge into said register all binary numbers less than binary number 1000 then in either said counter.

10. The arrangement specified in claim 9 wherein said first control-net "OR" gate has a third input terminal which is connected to the input of a polarity-inverter which has an output connected to a second input terminal of said first control-net "AND" gate.

11. The arrangement specified in claim 10 wherein a second control-net bistable element has a "first output terminal" connected to an input of each of the converter "AND" gates recited in claim 7 and also through a delay-element, to a reset terminal of its own, and has a second output terminal connected to reset said register, a second input terminal of said second control-net bistable element being connected to the "first control-net terminal."

12. The arrangement specified in claim 11 wherein a second control-net "AND" gate has one input terminal connected to said third input terminal and a second input terminal connected to the "first output terminal," the output of said second control-net "AND" gate being connected to a first input terminal of a third control-net bistable element having a first output terminal connected to reset said accumulator and a second output terminal connected through a delay-element to a second input terminal of its own.

13. The arrangement specified in claim 5 wherein said means also includes a control-net including a fourth control-net "AND" gate having its inputs respectively connected to the terminal indicating 8 in each pulse counter and which has its output connected through "OR" gates to the sections of said accumulator which respectively correspond to binary number 11.0101.

14. The method of registering a number proportional to the kilovoltamperes of an electrical circuit which comprises feeding into a first pulse-counter a number $\overline{W}$ of pulses proportional to the kinowatt hours flowing therein during an interval of time, feeding into a second pulse counter a second number R of pulses proportional to the kilovolt reactive ampere hours flowing in said circuit during said interval of time and, when said number $\overline{W}$ arrives at a predetermined value Z, registering in an accumulator a number proportional to $\overline{W}$ and a second number proportional to $\sqrt{W^2+R^2}-Z$.

15. A computer for approximately $\sqrt{A^2+B^2}$ where A is an integer and B a smaller integer which comprises a first means for registering A as a digital number, a second means for registering a digital number equal to B, and means controlled by said second means, for each value of B, for adding to the registration of said first means a binary number equal to $\sqrt{A^2+B^2}-A$.

16. An arrangement as claimed in claim 1 wherein said electrical network comprises an electric power system having a KWH pulse meter and a KVARH pulse meter, said counters being binary counters respectively receiving pulse inputs proportional to the outputs of said meters, and said means includes a register arranged to segrate separate digits X1 and XN and X1' to XN' which may combine in digit groups to represent B, the content of the other said counter, and "AND" gates respectively connected to be rendered conductive by one of said digit groups when that group correctly represents B, said "AND" gates, when conductive, respectively, energizing means in said accumulator which cause it to register a number proportional to $$\sqrt{A^2+B^2}-A$$

17. An electrical network as claimed in claim 1 comprising a first and a second input terminal respectively feeding into said first and second pulse counters, said means comprising a common pulse register and a common control circuit, said pulse counters each having an output feeding into said common puse register and another output feeding into said control-circuit; said control circuit containing means for sending a signal to said register when either of said counters registers a predetermined number of pulses, a converter, and means for passing into the converter a reading proportional to the excess over said predetermined number of the combined contents of said two counters, said converter containing means for delivering from said converter to said accumulator groups of signals, determined by said excess, which augment the reading of said accumulators by powers of 2 which correspond to the square root of the sum of the squares of the pulse-contents of said counters.

18. The apparatus specified in claim 17 wherein a third input terminal delivers a signal to said common control-circuit, at a predetermined time when if neither said first nor said second counter has registered a count as great as said predetermined number, said third means actuates said register to cause said accumulator to register a number equal to the content then in said register.

References Cited

UNITED STATES PATENTS

| 3,225,181 | 12/1965 | Styner | 235—158 |
| 1,647,332 | 11/1927 | Angus | 324—141 XR |
| 2,228,802 | 1/1941 | Yerger | 324—141 X |

MALCOLM A. MORRISON, Primary Examiner

J. F. RUGGIERO, Assistant Examiner

U.S. Cl. X.R.
235—158; 324—141